United States Patent [19]

McGregor et al.

[11] Patent Number: 4,965,833

[45] Date of Patent: Oct. 23, 1990

[54] VOICE ENHANCER SYSTEM

[76] Inventors: Thomas McGregor, West Lodge, Balmuto, Kirkcaldy, Fife KY2 5XA; George A. Wemyss, Baltilly Lodge, Ceres, Fife KY15 5QG; Ian M. Firth, Anworth Cottage, Giffordtown, Fife, all of Scotland

[21] Appl. No.: 232,800

[22] Filed: Aug. 16, 1988

[30] Foreign Application Priority Data

Aug. 19, 1987 [GB] United Kingdom ............... 8719624
May 25, 1988 [GB] United Kingdom ............... 8812434

[51] Int. Cl.⁵ .......................................... H04R 27/00
[52] U.S. Cl. ...................................... 381/83; 381/93; 381/86
[58] Field of Search .................... 381/71, 86, 93, 83

[56] References Cited

U.S. PATENT DOCUMENTS

| | | | |
|---|---|---|---|
| 1,060,851 | 5/1913 | Pape | 379/167 |
| 1,182,926 | 5/1916 | O'Brien | 379/167 |
| 1,272,993 | 7/1918 | Pape | 37/167 |
| 2,723,316 | 11/1955 | Goodell et al. | 381/83 |
| 3,105,877 | 10/1963 | Miller et al. | 381/83 |
| 3,168,619 | 2/1965 | Harrison | 379/167 |
| 3,238,302 | 3/1966 | Curchaek | 379/167 |
| 3,665,106 | 5/1972 | Parshad | 381/83 |
| 4,506,380 | 3/1985 | Matsui | 381/86 |
| 4,588,859 | 5/1986 | Liberman | 379/167 |
| 4,589,133 | 5/1986 | Swinbanks | 381/71 |
| 4,641,344 | 2/1987 | Kasai et al. | 581/86 |
| 4,817,160 | 3/1989 | De Koning et al. | 381/83 |

FOREIGN PATENT DOCUMENTS 130523 4/1978 German Democratic Rep. ... 381/83

OTHER PUBLICATIONS

Brook, "A Frequency Shifter for Public Address Systems" Electronics Australia, vol. 37, No. 5, pp. 54, 55, 57, 59, Aug. 1975.

Primary Examiner—Forester W. Isen
Attorney, Agent, or Firm—James D. Hall

[57] ABSTRACT

A voice enhancer system for a car includes a pair of microphones positioned adjacent to the front seats of the car, and a pair of loudspeakers positioned adjacent to the rear seats. The microphones are connected to the loudspeakers, via an amplifier/electrical conditioning unit, by electrical wiring positioned behind the car's upholstery. The conditioning unit, which includes filters and a frequency shifter is adjusted to prevent acoustical 'howl-around' within the enclosure of the car. For voice enhancement from the rear to the front of the car, microphones may be positioned adjacent to the rear seats, and loudspeakers may be positioned adjacent to the front seats, these components being connected together, via a second amplifier/electrical conditioning unit, by electrical wiring.

15 Claims, 3 Drawing Sheets

VOICE ENHANCER SYSTEM

BACKGROUND TO THE INVENTION

This invention relates to a voice enhancer system for use in cars, taxis or other motor vehicles.

Normal conversation in moving cars is often difficult between the driver and the front seat passenger, but between the front and rear seat occupants, conversation is even more difficult. Although modern cars are much quieter than their predecessors, background road noise and the position and aspect of the occupants makes dialogue difficult. The driver, in particular, is usually obliged to speak while looking straight ahead, and his voice must therefore be reflected off the windscreen before being picked up by the other occupant(s) of the car. The presence of bulky headrests further impairs the situation. The opening of a window, or the tilting of the sun roof, introduces further noise into the vehicle, and usually ends any attempt at conversation. Even under better conditions, many people, especially the elderly, have difficulty picking up some of the higher speech frequencies, and this problem is accentuated, because of acoustical masking, when the level of background noise increases.

The aim of the invention is to provide a system for enhancing voices within motor vehicles, thereby enabling normal conversation to take place even when road noise is quite high.

SUMMARY OF THE INVENTION

The present invention provides a voice enhancer system for a motor vehicle, the system comprising at least one microphone connected to at least one loudspeaker by a multi-component amplifier/electrical conditioning unit, wherein the components of the amplifier/electrical conditioning unit are adjusted to prevent acoustical 'howl-around'.

Preferably, the system further comprises at least one second microphone connected to at least one second loudspeaker by a second multi-component amplifier/electrical conditioning unit, wherein the components of the second amplifier/electrical conditioning unit are adjusted to prevent acoustical 'howl-around'. Conveniently, the system further comprises a switching unit for selectively activating the amplifier/electrical conditioning units.

The or each amplifier/electrical conditioning unit may include filters, preferably a low pass filter, a high pass filter, and a notch filter, and a frequency shifter. Advantageously, the or each low pass filter is rated at 3 kHz, and the or each high pass filter is rated at 200 Hz, and the or each frequency shifter increases all incoming frequencies by between 2 and 10 Hz, and preferably by 5 Hz. The or each amplifier/electrical conditioning unit may further include a pre-amplifier upstream of the filters and frequency shifter, and a power amplifier downstream of the filters and frequency shifter. The or each pre-amplifier is preferably provided with an on/off switch.

The invention also provides a motor vehicle incorporating a voice enhancer system as defined above, wherein the microphone(s), the loudspeaker(s) and the amplifier/electrical conditioning unit(s) are interconnected by electrical wiring positioned behind the vehicle upholstery, and wherein the system is powered by the normal vehicle supply voltage.

Where the motor vehicle is a car, there are two first-mentioned microphones, two first-mentioned loudspeakers, two second microphones and two second loudspeakers, the first-mentioned microphones and the second loudspeakers being positioned in the front of the car, and the second microphones and the first-mentioned loudspeakers being positioned in the rear of the car, a respective microphone/loudspeaker pair being mounted in the car upholstery adjacent to the seat of each of the four normal car occupants at favourable acoustic positions. In this case, each of the amplifier/electrical conditioning units is such as to feed some of the signal amplified thereby to the loudspeakers associated with the other amplifier/electrical conditioning unit.

Where the motor vehicle is a taxi, there is one first-mentioned microphone, two first-mentioned loudspeakers, two second microphones and one second loudspeaker, the first-mentioned microphone and the second loudspeaker being positioned adjacent to the driver's seat in a favourable acoustical position, and the first-mentioned loudspeakers and the second microphones being positioned in microphone/loudspeaker pairs adjacent to the rear passenger seats in favourable acoustical positions. In this case, the on/off switch associated with the first-mentioned amplifier/electrical conditioning unit is a latch switch, and the on/off switch associated with the second amplifier/electrical conditioning unit is a push-button switch biassed towards its off position.

Advantageously, each of the loudspeakers is provided with a volume control, and each of the microphones is a small, flat electret microphone.

BRIEF DESCRIPTION OF THE DRAWINGS

Two forms of voice enhancer system, each of which is constructed in accordance with the invention, will now be described, by way of example, with reference to the accompanying/drawings, in which.

DESCRIPTION OF PREFERRED EMBODIMENTS

Figure 1:
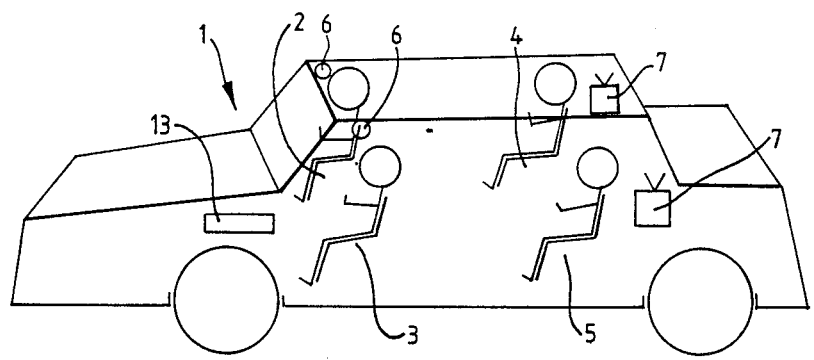
FIG. 1 is a schematic perspective view of the interior of a car incorporating the first form of voice enhancer system.

Referring to the drawings, FIG. 1 shows the interior of a car 1 together with the four normal passenger seats 2, 3, 4 and 5. For prime speech enhancement from front passengers to rear passengers, a pair of small flat electret microphones 6 (one respectively at the left and right of the car at the front), and a pair of loudspeakers 7 (one respectively at the left and right of the car at the rear) are provided adjacent to each of the seats 2 and 3, and 4 and 5 respectively. The front microphones 6 and the rear loudspeakers 7 are connected together via an amplifier/electrical conditioning unit 8 (see FIG. 2) by the electrical wiring in the car, this wiring being already in place behind the car upholstery. The unit 8 (see FIG. 3) includes a pre-amplifier 8a, a low pass filter 8b, a high pass filter 8c, a notch filter 8d, a frequency shifter 8e and a power amplifier 8f. These are all adjusted, prior to installation, so as to prevent acoustical 'howl-around' in the enclosure of the car 1 between the microphones 6 and the loudspeakers 7.

Each of the loudspeakers 7 may be provided with its own volume control, so that each of the rear car occupants can set the adjacent loudspeaker to the required loudness output to suit the prevailing noise conditions within the car.

Similarly, for enhancement of speech from rear passengers to front passengers, a pair of small, flat electret microphones 9 (one respectively at the left and right of the car 1 at the rear), and a pair of loudspeakers 10 (one respectively at the left and right of the car 1 at the front) are provided adjacent to each of the seats 4 and 5, and 2 and 3 respectively. The rear microphones 9 and the front loudspeakers 10 are connected together via an amplifier/electrical conditioning unit 11 (see FIG. 2) by the electrical wiring. The unit 11 is identical to the unit 8, and includes a pre-amplifier 11a, a low pass filter 11b, a high pass filter 11c, a notch filter 11d, a frequency shifter 11e, and a power amplifier 11f (none of which are shown—but are identical to the items 8a to 8f shown in FIG. 3). The components of the unit 11 are similarly adjusted, prior to installation, to prevent acoustical 'howl-around' in the enclosure of the car 1. A logical switching unit 12 is provided between the units 8 and 11 to select which system, front-to-rear, or rear-to-front, is to be active, thereby maximising enhancement of speech and suppression of 'howl-around'.

The three units 8, 11 and 12 are incorporated in a single control box 13 (see FIG. 1) which can be positioned on or under the dashboard within easy reach of the driver. The control box 13 is provided with an on-/off switch and a volume control switch (neither of which is shown), the latter controlling the amplifier via a gain control circuit.

The two pairs of microphones 6 and 9 mounted around the inside of the car 1 convert the speech of the occupants to electrical pulses in the usual way. These are then transmitted, via the electrical wiring behind the upholstery, to the two pairs of loudspeakers 7 and 10 located close to the ear of the driver and the three (say) occupants. The power requirements for the system are minimal, and are provided from the car's existing electrics. The interior layout of most vehicles permits the easy siting of microphones and loudspeakers either on, or within, the existing fabric. The system could, therefore, be added to existing vehicles, but ideally it would be incorporated at the time of manufacture, thereby resulting in a very unobtrusive appearance.

The components of the units 8 and 11 have the following functions. The low pass filters 8a and 11a are rated at 3 kHz, and are effective to reduce the amount of high frequency sound which is amplified, thereby reducing the degree of acoustical feedback which occurs more easily at high frequencies. The high pass filters 8b and 11b are rated at 200 Hz, and are effective to reduce vehicle low frequency noise. Low frequency noise would otherwise be detected by the microphones 6 and 9, and this would lead to overloading of the amplifiers 8f and 11f. The filters 8a, 8b, 11a and 11b are set so that the main band of speech frequencies is passed, without loss, therethrough. The notch filters 8c and 11c are effective to reduce frequencies at which 'howl-around' is particularly easily excited. Such frequencies are usually caused by resonances in the microphones 6 and 9 or in the loudspeakers 7 and 10, or in the acoustic enclosure of the car 1. The notch filters 8c reduce the overall amplification of objectionable frequency bands, but do not generally reduce speech intelligibility. The frequency shifters 8e and 11e (for example of the type Frequency Shifter No. 5 as supplied by Surrey Electronics) increases all speech frequencies passing through the components 8 and 11 by 5 Hz. This frequency increase is small enough not to be detected by listeners, but is large enough to prevent a closed acoustic feedback path being maintained in each microphone (electronic amplification path) to loudspeaker (acoustic path) to microphone (electronic amplification path) chain. The chosen frequency shift of 5 Hz is not critical, but it is preferable. The preferred frequency shift range is from 2 to 10 Hz. A frequency shift of less than about 2 Hz will not be sufficient to prevent 'howl-around', and a frequency shift greater than about 10 Hz will lead to speech distortion.

The conditioning units 8 and 11 are such that some of the amplified signal is fed to the loudspeakers adjacent to the microphones from which the original (unamplified) signal came. This increases the overall speech ambience, and produces a better spatial localisation of the person speaking, by car occupants. Thus, for front-to-rear enhancement, some of the amplified signal is fed to the front loudspeakers 10, so that passengers in the rear of the car 1 hear speech from the front-seat occupants via the front loudspeakers 10 as well as via the rear loudspeakers 7. In this way, the rear passengers get a better appreciation of the source of the voice being amplified, and reception is more natural.

Often, speech enhancement is only necessary from the front to the rear of the car 1, in which case the switching unit 12 is switched for front-to-rear operation only. Alternatively, the first form of system could be modified by omitting the microphones 9, the conditioning unit 11 and the switching unit 12. Voice enhancement would then only be possible from front-to-rear. The front loudspeakers 10 are retained, so as to maintain the improved overall speech ambience which results from the reduced level of amplified signal fed to these loudspeakers from the amplifier 8e of the conditioning unit 8.

The system thus permits relatively effortless conversation to take place while the car is in motion. It is anticipated that this facility would appeal to the executive business user. If installed at the time of manufacture, it should be sufficiently inexpensive to appeal to family users as well.

It will be apparent that the system described above with reference to FIGS. 1 to 3 could be modified in a number of ways. For example, the system could use its own wiring rather than using the existing electrical wiring system present in the car. Also, the microphones for the rear seat occupants could be located in the rear of the headrests of the front seats or in the roof fabric. In some cases, more than one microphone per passenger could be used. The exact locations of the microphones and loudspeakers will vary depending upon the type and make of car. Preferably, the system is installed at factory level, and the installation is preceded by an acoustical investigation of the car enclosure. This leads to a determination of the best position for the microphones and loudspeakers, the correct setting for the frequency shifters, and the correct notch, low pass and high pass filters for the best operation.

Figure 4:
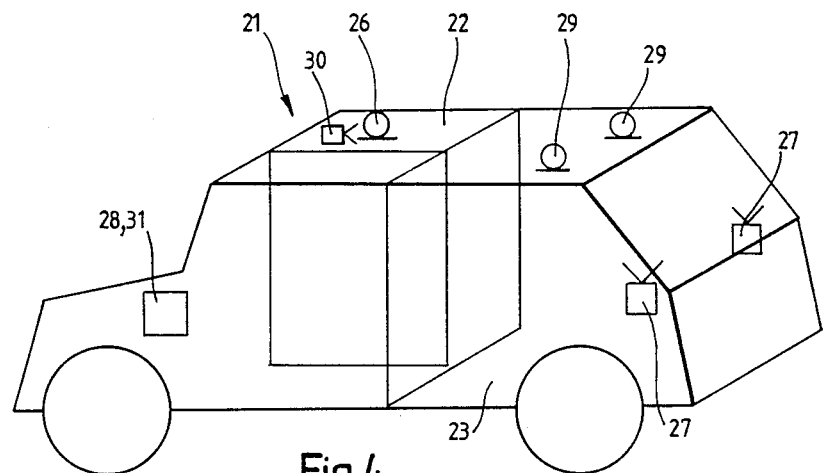
FIG. 4 is a schematic perspective view of a taxi incorporating the second form of voice enhancer system.

FIG. 4 shows the interior of a taxi 21 provided with the second form of voice enhancer system. This system overcomes the difficulty of one/two way communication between a taxi driver and passenger(s), particularly when the taxi is in motion. Communication in taxis is difficult because of the distance and isolation between the driver and passengers. The driver, seated at some distance from the passengers in his isolated cab, and obliged to speak straight ahead while moving is in the worst position for his speech to be understood clearly. Engine noise and noise introduced by open windows further reduces the intelligibility of his speech to passengers. The passengers, in giving verbal instructions when the car is moving, have firstly to attract the attention of the driver so that he opens his rear window, and then have the difficulty of leaning forward to speak to the driver, through the acoustic barrier of the partially-open window, whose attention is on the road.

The taxi 21 has a driver's cab 22 and a passenger compartment 23. The second form of voice enhancer system includes, for speech enhancement from the cab 22 to the compartment 23, a small, flat electret microphone 26, a pair of loudspeakers 27, and an amplifier-/electrical conditioning unit 28. The microphone 26 is positioned in the roof upholstery of the cab 22 in front of the driver's seat (not shown). The loudspeakers 27 are positioned on the back parcel shelf of the compartment 23. Alternatively, the loudspeakers 27 could be positioned in the roof upholstery of the passenger compartment 23. The driver's microphone 26 and the passenger compartment's loudspeakers 27 are connected together, via the amplifier/electrical conditioning unit 28, by electrical wiring positioned behind the taxi upholstery.

Figure 5:
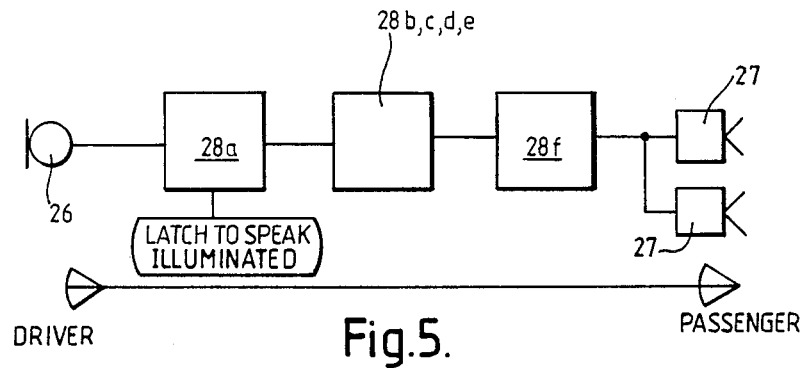
FIG. 5 is a block circuit diagram showing the major units of the second form of system, in the driver-to-passenger enhancing mode.

The unit 28 (see FIG. 5) includes a pre-amplifier 28a, a low pass filter 28b, a high pass filter 28c, a notch filter 28d, a frequency shifter 28e and a power amplifier 28f. In the schematic arrangement of FIG. 5, the components 28b, 28c, 28d and 28e are depicted by a single block. All the components 28a to 28f of the unit 28 are similar to the corresponding components of the units 8 and 11.

In order to permit voice enhancement from the driver's cab 22 to the passenger compartment 23, the pre-amplifier 28a is provided with a latch switch 24. The latch switch 24 preferably includes a time delay circuit which is effective to switch the pre-amplifier 28a off a predetermined time after it has been latched on by the driver. This permits the driver to operate the system in virtually a hands-off manner, thereby ensuring that the driver can use both hands for driving practically all the time. Alternatively, a straightforward on-off latch switch could be used instead of the time-delay latch switch 24. In this case, the driver would have to operate the switch to turn voice enhancement both on and off. The time-operated latch switch 24 is preferable, as it helps to ensure privacy for the passenger(s), in that it automatically turns off driver-to-passenger voice enhancement after say 10 seconds, and so ensures that any passenger is not disturbed by the driver should he forget (or be too busy concentrating on driving) to turn off a normal latch switch.

Similarly, for enhancement of speech from the passenger compartment 23 to the driver's cab 22, the system includes a pair of small, flat electret microphones 29, a loudspeaker 30, and an amplifier/electrical conditioning unit 31. The microphones 29 are positioned in the roof upholstery of the passenger compartment 23 in front of the rear passenger bench seat (not shown). The loudspeaker 30 is positioned in the roof upholstery of the driver's cab 22 in front of the driver's seat (not shown). The passenger microphones 29 and the driver's loudspeaker 30 are connected together, via the amplifier/electrical conditioning unit 31, by electrical wiring positioned behind the taxi upholstery.

Figure 6:
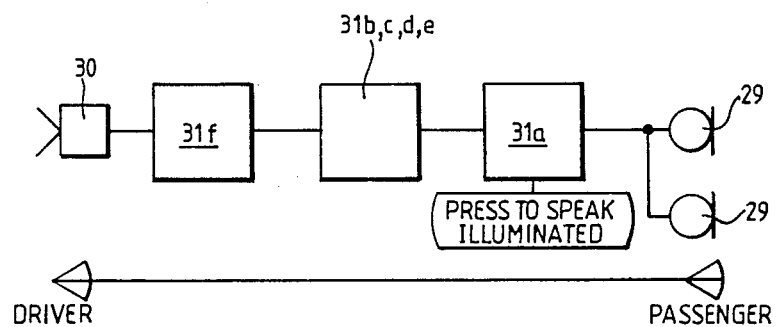
FIG. 6 is a block circuit diagram similar to that of FIG. 5, but showing the second form of system in the passenger-to-driver enhancing mode.

The unit 31 (see FIG. 6) includes a pre-amplifier 31a, a low pass filter 31b, a high pass filter 31c, a notch filter 31d, a frequency shifter 31e, and a power amplifier 31f. In the schematic arrangement of FIG. 6, the components 31b, 31c, 31d and 31e are depicted by a single block. All the components 31a to 31f are similar to the corresponding components of the units 8, 11 and 28. In the schematic arrangement of FIG. 4, the units 28 and 31 are depicted by a single block.

In order to permit voice enhancement from the passenger compartment 23 to the driver's cab 22, the pre-amplifier 31a is provided with a make-to-speak push-button 25, which is effective to switch the pre-amplifier on as long as the push-button is held in. The push-button is spring-biased towards the position in which the pre-amplifier 31a is switched off. This helps to ensure passenger privacy, as it is difficult for a passenger to forget that the voice enhancement system is activated for the passenger compartment 23 to driver's cab 22 direction. (This is to be contrasted with the situation where a simple latch switch is provided for the pre-amplifier 31a, in which case it would be relatively easy for passengers to forget the system had been activated, and to inadvertently leave it on.) Both the latch switch 24 and the push-button 25 are provided with illuminated notices for confirming that voice enhancement, in the appropriate direction, is activated.

Figure 2:
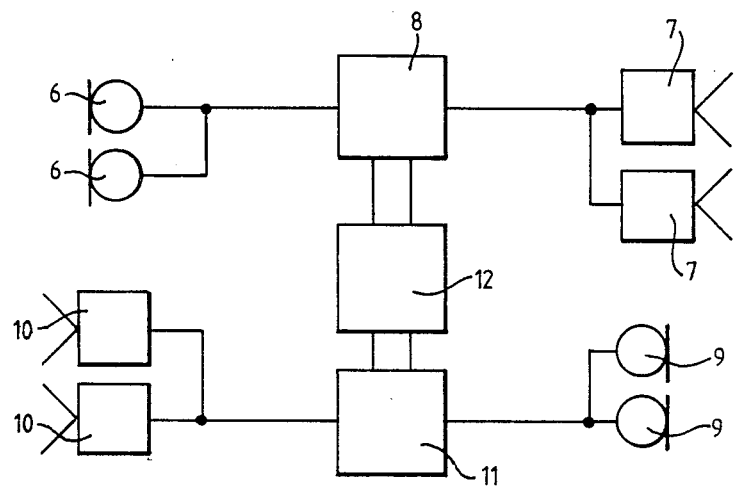
FIG. 2 is a block circuit diagram showing the major units of the first form of system.
Figure 3:
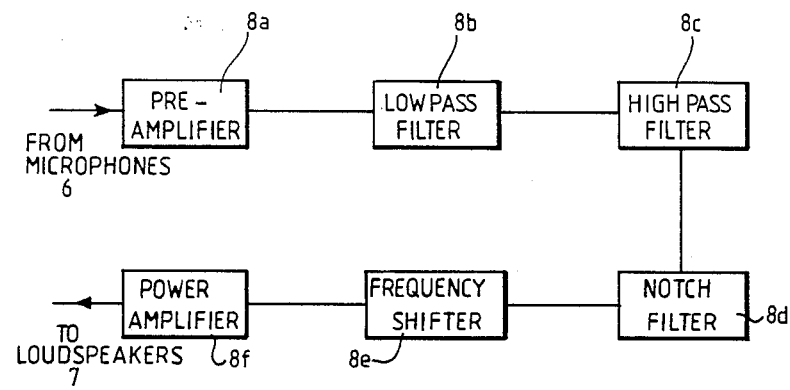
FIG. 3 is a block circuit diagram showing the components making up one of the units shown in FIG. 2.

As with the embodiment of FIGS. 1 to 3, the various components of the units 28 and 31 are adjusted to prevent acoustical 'howl-around'. The system is such that the occupant(s) of the passenger compartment 23 will hear loud clear speech from the driver, who does not have to strain his voice, nor alter his head position when speaking. Communication is, therefore, easy from driver to passenger, and vice versa, without strain on speaker or listener. At the same time, the system is such as to ensure privacy of conversation within the passenger compartment 23, and a generally hands-off operation of the system by the driver. Consequently, the system fully complies with the regulations relating to taxis.

Although the various components of the units 8, 11, 28 and 31 described above are analogue, it will be apparent that these components could be digital components. Indeed, as filters and frequency shifters can be made more accurately if digital, digital components would be preferable. With a digital system, the technique for reducing 'howl-around' (called digital adaptive filtering) could be used. Here, the filters adapt continuously to prevent 'howl-around'. In such a digital system, the chain of components in a given voice enhancement path would be: microphone, pre-amplifier, analogue-to-digital converter, digital adaptive filters, digital frequency shifter, digital-to-analogue converter, power amplifier, loudspeaker(s).

It will be apparent that modifications could be made to the embodiments described above. For example, where engine noise is particularly troublesome (as is often the case with taxis which have relatively noisy diesel engines), the system could be modified by incorporating an additional microphone to pick up engine noise, and a phase reverser for reversing the phase of the sound picked up by the additional microphone. The output of the phase reverser would then be fed to the pre-amplifiers of the system to cancel the engine noise.

We claim:

1. A voice enhancer system for a motor vehicle, the system comprising at least one microphone connected to at least one loud speaker by a multi-component amplifier/electrical conditioning unit, wherein the components of the amplifier/electrical conditioning unit include a low pass filter, a high pass filter, a notch filter and a frequency shifter, said frequency shifter constituting means for shifting the frequency of sounds prior to the sound being transmitted through the loud speaker whereby acoustical 'howl-around' is prevented.

2. A system according to claim 1, further comprising at least one second microphone connected to at least one second loudspeaker by a second multi-component amplifier/electrical conditioning unit, wherein the components of the second amplifier/electrical conditioning unit are adjusted to prevent acoustical 'howl-around'.

3. A system according to claim 2, further comprising a switching unit for selectively activating the amplifier/electrical conditioning units.

4. A system according to claim 1, wherein each low pass filter is rated at 3 kHz, each high pass filter is rated at 200 Hz, and each frequency shifter increases all incoming frequencies by between 2 and 10 Hz.

5. A system according to claim 1, wherein each amplifier/electrical conditioning unit further includes a pre-amplifier upstream of the associated filters and frequency shifter, and a power amplifier downstream of the associated filters and frequency shifter.

6. A system according to claim 5, wherein each pre-amplifier is provided with an on/off switch.

7. A taxi incorporating a voice enhancer system, the system comprising one first microphone, two first loud speakers, two second microphones and one second loud speaker, the first microphone and second loud speaker being positioned adjacent to a drivers seat and the first loud speakers and the second microphones being positioned in microphone/loud speaker pairs adjacent to the rear passenger seats, the first microphone connected to said two first loud speakers by an amplifier/electrical conditioning unit, both second microphones connected to said second loud speaker by a second amplifier/electrical conditioning unit, each amplifier/electrical conditioning unit including a low pass filter, a high pass filter, a notch filter, a frequency shifter, a pre-amplifier upstream of the associated filters and frequency shifter, and a power amplifier downstream of the associated filters and frequency shifter, wherein each pre-amplifier is provided with an on/off switch, and wherein the on/off switch associated with the first amplifier/electrical conditioning unit is a latch switch, and the on/off switch associated with the second amplifier/electrical conditioning unit is a push button switch biased towards its off position.

8. A motor vehicle incorporating a voice enhancer system, the system comprising at least one first microphone connected to at least one first loud speaker by a multi-component amplifier/electrical conditioning unit, the system further comprising at least one second microphone connected to at least one second loud speaker by a second multi-component amplifier/electrical conditioning unit, wherein the components of each of the amplifier/electrical conditioning units include a low pass filter, a high pass filter, a notch filter and a frequency shifter, said frequency shifter constituting means for shifting the frequency of sounds before the sounds are transmitted through said amplifiers whereby acoustical howl-around is prevented, wherein the microphones, the loud speakers and the amplifiers/electrical conditioning units are interconnected by electrical wiring positioned behind the vehicle upholstery, and wherein the system is powered by the vehicle supply voltage.

9. A motor vehicle according to claim 8, wherein the motor vehicle is a car and there are two first microphones, two first loudspeakers, two second microphones and two second loudspeakers, the first microphones and the second loudspeakers being positioned in the front of the car, and the second microphones and the first loudspeakers being positioned in the rear of the car, a respective microphone/loudspeaker pair being mounted in the car upholstery adjacent to each of four seating positions.

10. A car according to claim 9, wherein each of the amplifier/electrical conditioning units is such as to feed some of the signal amplified thereby to the loudspeakers associated with the other amplifier/electrical conditioning unit.

11. A motor vehicle according to claim 8, wherein the motor vehicle is a taxi and there is one first microphone, two first loudspeakers, two second microphones and one second loudspeaker, the first microphone and the second loudspeaker being positioned adjacent to the driver's seat, and the first loudspeakers and the second microphones being positioned in microphone/loudspeaker pairs adjacent to rear passenger seats.

12. A taxi according to claim 11, wherein each amplifier/electrical conditioning unit includes a low pass filter, a high pass filter, a notch filter, a frequency shifter, a pre-amplifier upstream of the associated filters and frequency shifter, and a power amplifier downstream of the associated filters and frequency shifter, wherein each pre-amplifier is provided with an on/off switch, and wherein the on/off switch associated with the first amplifier/electrical conditioning unit is a latch switch, and the on/off switch associated with the second amplifier/electrical conditioning unit is a push-button switch biassed towards its off position.

13. A voice enhancer system for a motor vehicle, the system comprising at least one microphone connected to at least one loudspeaker by a multi-component amplifier/electrical conditioning unit, wherein the components of the amplifier/electrical conditioning unit include a low pass filter, a high pass filter, a notch filter and a frequency shifter positioned between said microphone and amplifier.

14. A voice enhancer system for a motor vehicle, the system comprising first and second microphones each connected respectively to first and second loudspeakers by first and second multi-component amplifier/electrical conditioning units, wherein the components of the first and second amplifier/electrical conditioning units each include a low pass filter, a high pass filter, and a notch filter and a frequency shifter positioned between each microphone and its corresponding loudspeaker, said frequency shifter constituting means for preventing acoustical howlaround.

15. A car incorporating a voice enhancer system, the system comprising two first microphones connected to two first loud speakers by a first multi-component amplifier/electrical conditioning unit, the system further comprising two second microphones connected to two second loud speakers by a second multi-component amplifier/electrical conditioning unit, the components of each of the amplifier/electrical conditioning units including a high pass filter, a low pass filter, a notch filter and a frequency shifter, said frequency shifter constituting means for shifting the frequency of sounds before the sounds are transmitted through said amplifiers whereby acoustical howl-around is prevented, said first microphones and second loud speakers being positioned in a front of the car, said second microphones and first loud speakers being positioned in a rear of the car, a respective microphone/loud speaker pair being mounted in car upholstery adjacent to a seat of each of four car seating positions, the microphones, loud speakers, and amplifiers/electrical conditioning units being interconnected by electrical wiring positioned behind said car upholstery with the system powered by the vehicle supply voltage, wherein each amplifier/electrical conditioning unit constitutes means for feeding some of the signal amplified thereby to the loud speakers associated with the other amplifier/electrical conditioning unit.

* * * * *